United States Patent [19]

Cross et al.

[11] 4,392,803
[45] Jul. 12, 1983

[54] STICK CONFECTION EXTRACTION APPARATUS

[75] Inventors: Stephen D. Cross; Elmer F. Frost, Jr.; David N. Anderson, all of Lakeland, Fla.

[73] Assignee: FMC Corporation, Chicago, Ill.

[21] Appl. No.: 274,987

[22] Filed: Jun. 18, 1981

Related U.S. Application Data

[63] Continuation of Ser. No. 146,844, May 5, 1980, abandoned.

[51] Int. Cl.$^3$ .............................................. B28B 5/00
[52] U.S. Cl. ............................ 425/126 S; 425/436 R
[58] Field of Search ......................... 425/126 S, 436 R

[56] References Cited

U.S. PATENT DOCUMENTS

| | | | |
|---|---|---|---|
| 2,791,890 | 5/1957 | Höyer | 62/114 |
| 3,261,178 | 7/1966 | Okada | 62/345 |
| 3,407,755 | 10/1978 | Rasmusson | 425/126 S |
| 3,695,895 | 10/1972 | Brown | 99/136 |

Primary Examiner—James R. Hall
Attorney, Agent, or Firm—Louis J. Pizzanelli; Richard B. Megley

[57] ABSTRACT

An apparatus for extracting several frozen confections from the mold cups of the mold member of a freezing apparatus and for conveying the frozen confections away from the freezing apparatus while rotating each confection 90° and separating the confections to wider intervals. Such extractor-conveyor includes a plurality of extractor bar assemblies and an endless conveyor for moving the extractor bar assemblies from an extraction station to an ejection station. Each extractor bar assembly includes a plurality of gripper units that are initially arranged at relatively close intervals along the length of the extractor bar assembly that are each aligned with their direction of travel. The gripper units are connected by links and are mounted within a transverse channel so they may be rotated and separated as they are conveyed by a camming rail that is positioned to engage a cam follower roller attached to an end gripper unit.

17 Claims, 13 Drawing Figures

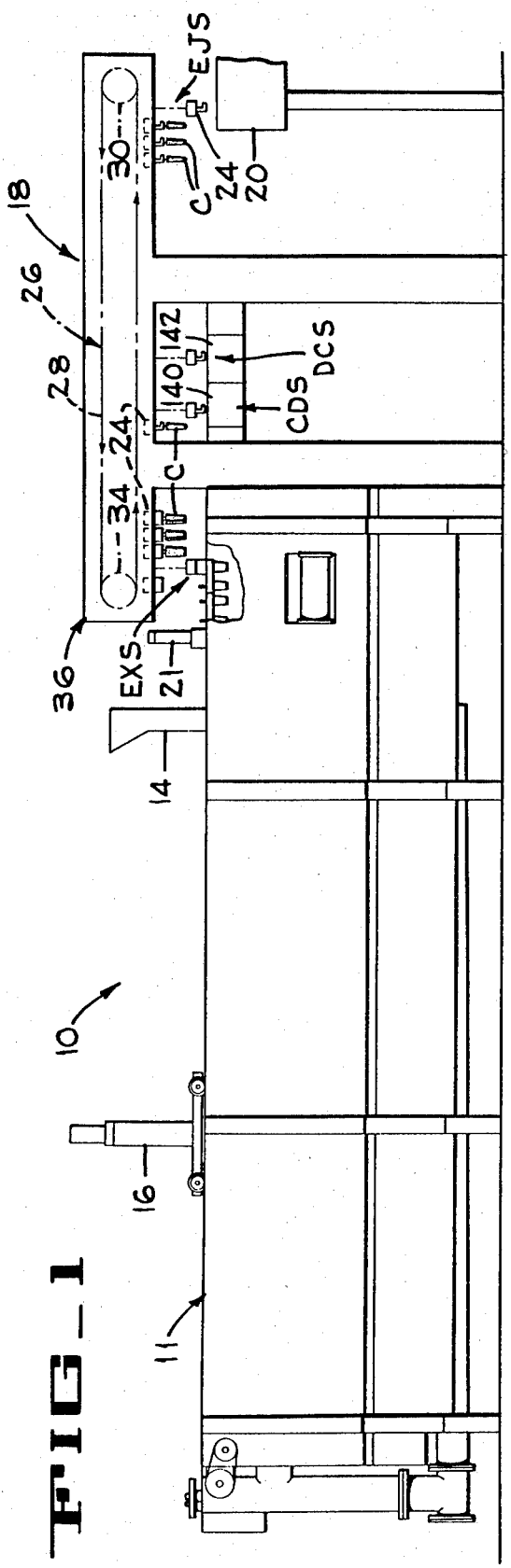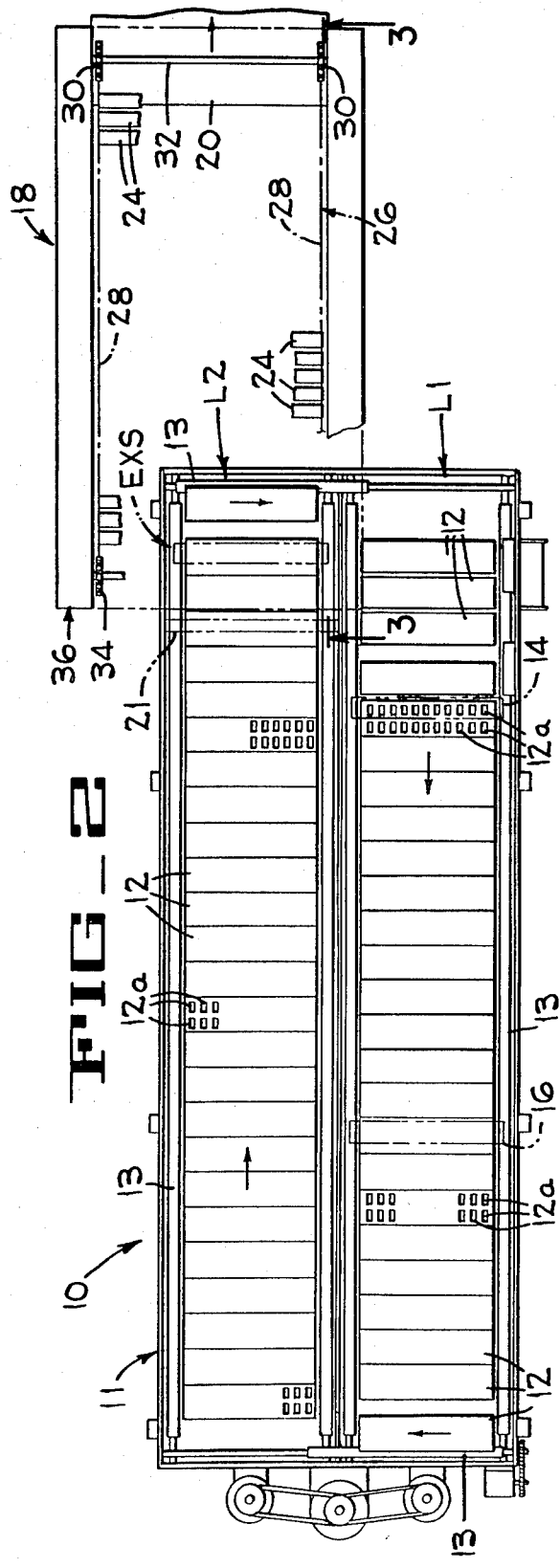

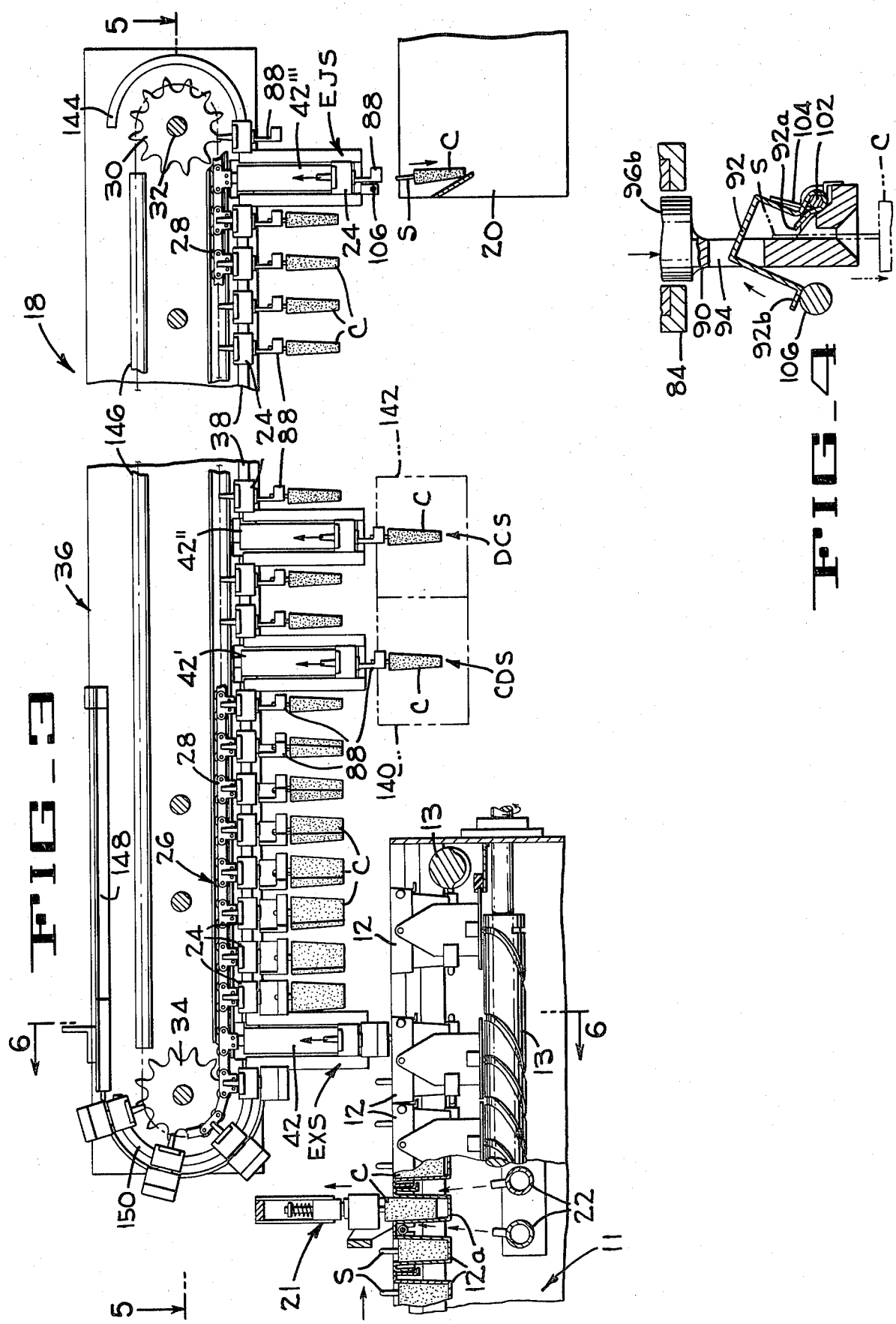

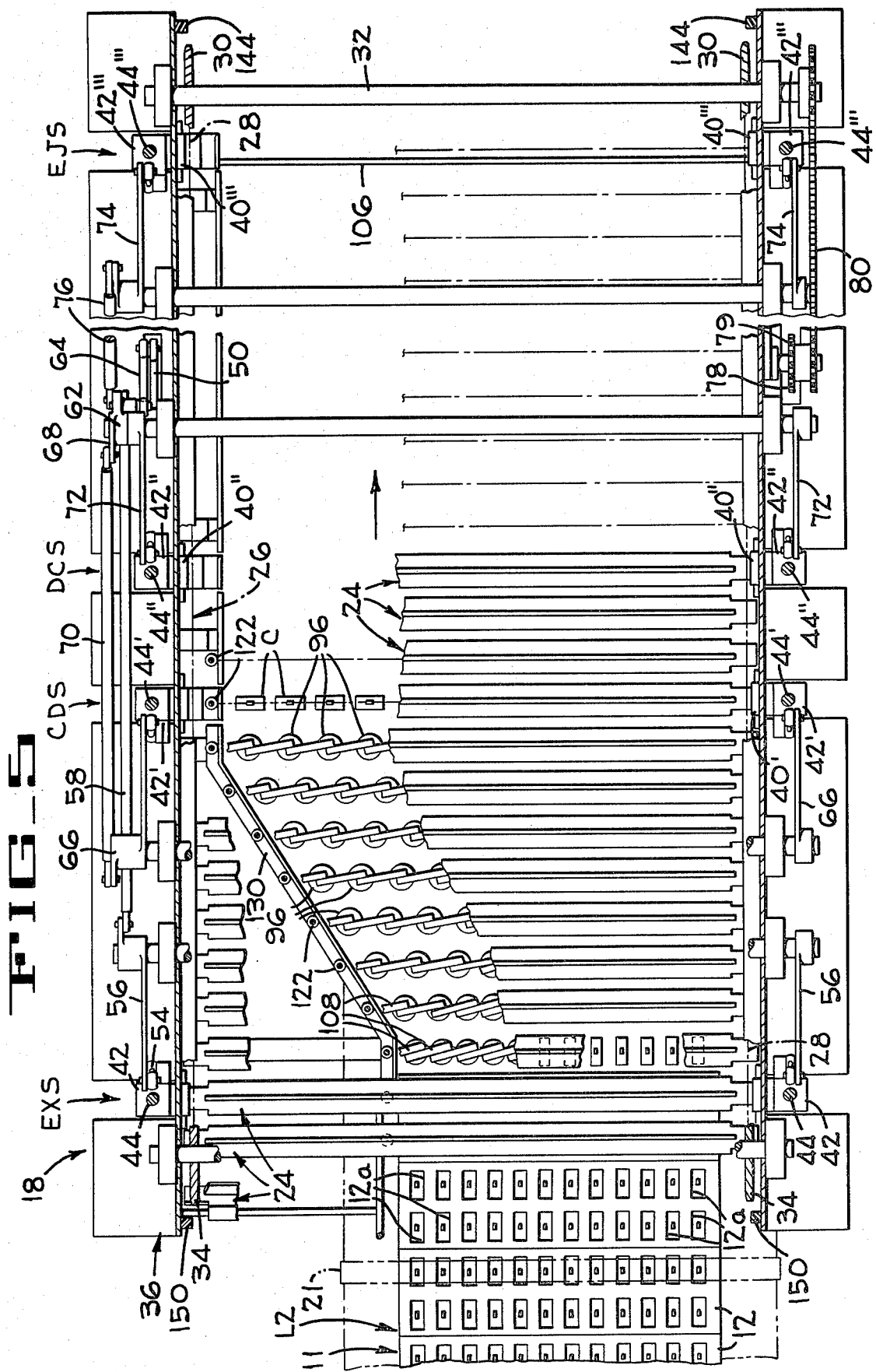

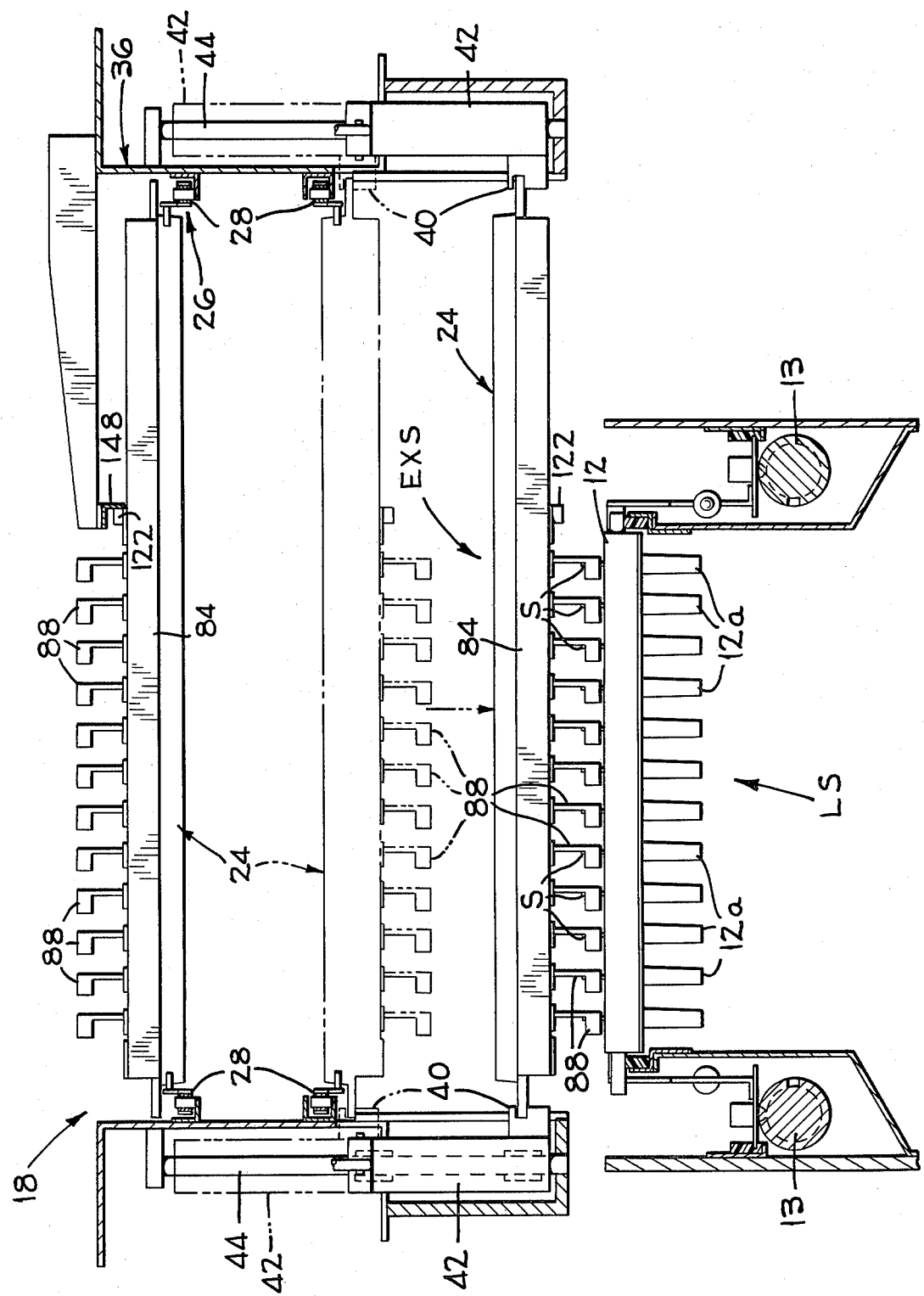
FIG_6

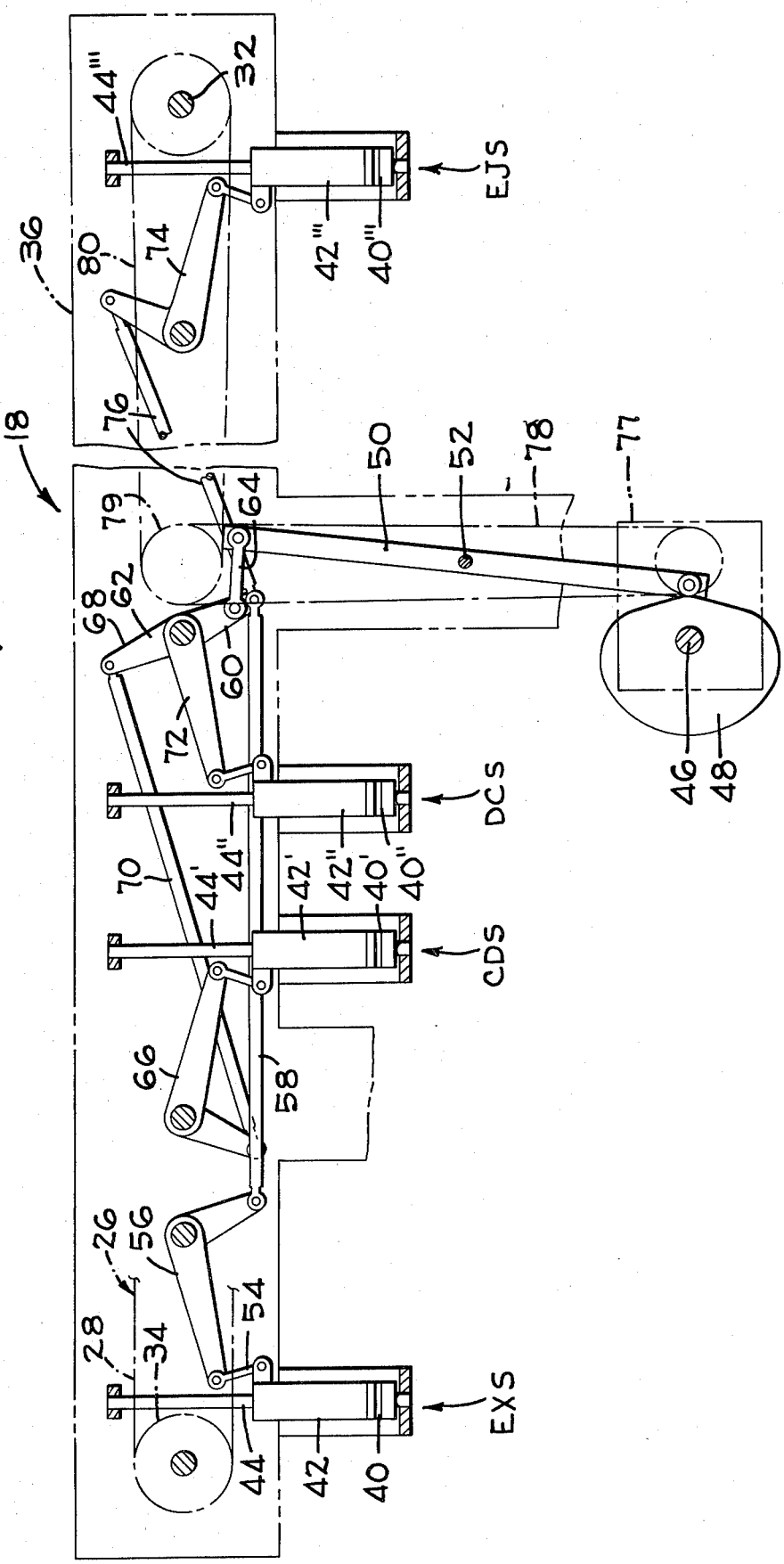

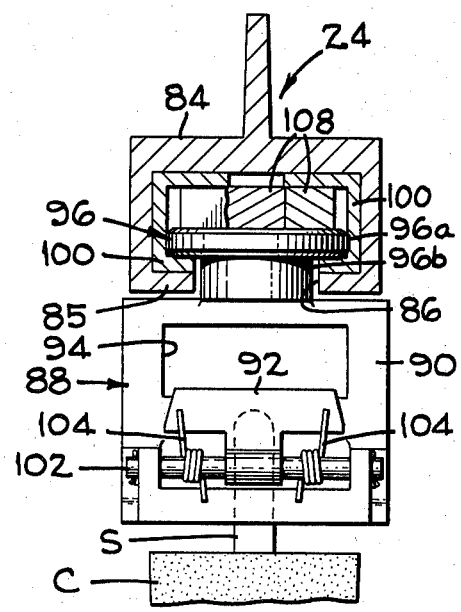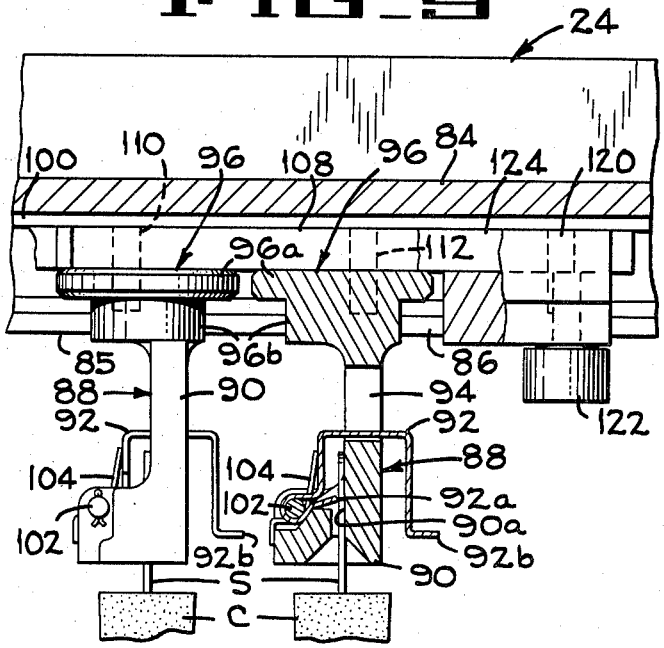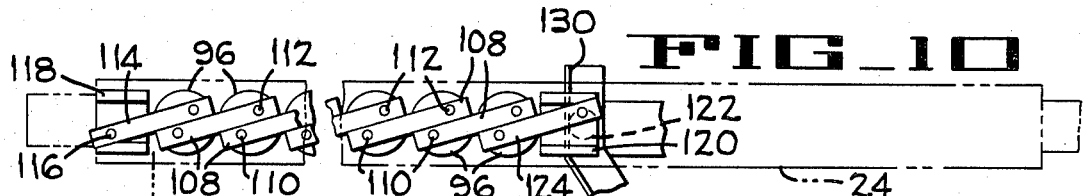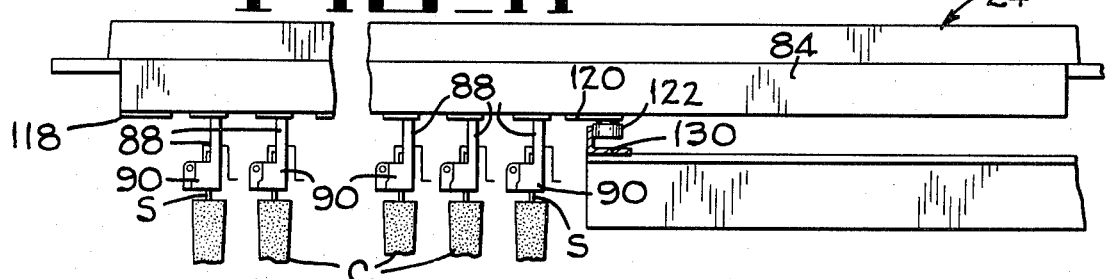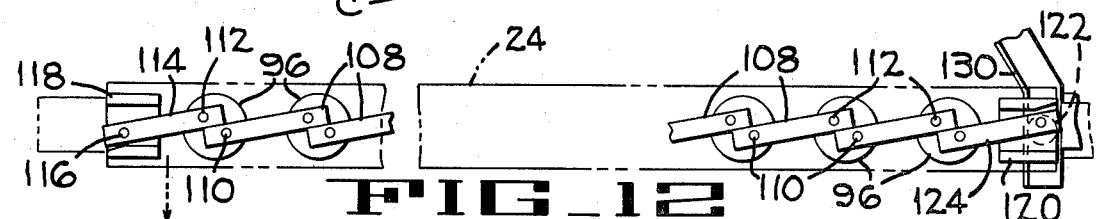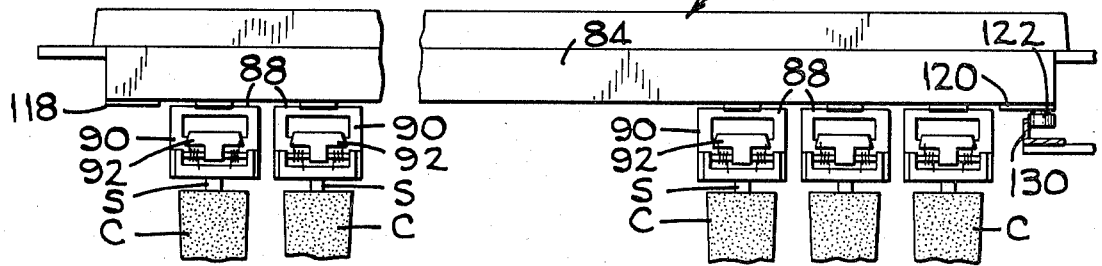

STICK CONFECTION EXTRACTION APPARATUS

This application is a continuation of application Ser. No. 146,844, filed May 5, 1980, now abandoned.

BACKGROUND OF THE INVENTION

1. Field of the Invention

The present invention generally relates to apparatus for producing frozen confections and more particularly concerns an apparatus for extracting frozen stick confections from an apparatus for producing such confections and for transferring the extracted confections to further apparatus.

2. Description of the Prior Art

For many years, systems for producing frozen confections have utilized a confection freezing apparatus that generally includes mold members having mold cups arranged therein in rows which extend transversely of the direction of travel of the cups. Confection material is deposited into the cups of each row by a filler at one point along the path of travel of the mold cups, and after the confection material has partially frozen, sticks are inserted therein. After the confection material has completely frozen, an extractor-conveyor is provided for removing the confections by grasping the sticks and pulling the frozen confections upwardly from the mold cups and for thereafter transferring the extracted confections to a wrapper. To enable the hard frozen confections to be removed from the mold cups, heat is applied to the outer surfaces of the mold cups to thaw the outer layer of confection material in contact with the cups. An example of a prior art system for producing frozen stick confections and an extractor-conveyor apparatus is shown in the U.S. Pat. No. 3,031,978 to M. B. Rasmusson. Similar examples of prior art frozen confection producing apparatus are shown in U.S. Pat. Nos. 2,791,890 to O. G. Hoeyer, 3,261,178 to Katsuto Okada and 3,695,895 to J. S. Brown. This latter patent particularly discloses extraction apparatus that includes spray devices for thawing or defrosting the confection material to enable the frozen confections to be separated from the mold cups.

In all of the known prior art frozen confection producing apparatus, the mold cups are arranged with their widest (major) cross-sectional dimensions extending transversely of their direction of travel with the mold conveyor. Flat wooden sticks are inserted into the confection material with their wide faces extending parallel to the wide dimensions of the cups. The prior art extractors and extractor-conveyors have been adapted to such orientations of the sticks and confections within the mold cups, and the apparatus for packaging or wrapping the frozen confections have also been adapted to such orentations.

Recently a new type of apparatus for producing frozen confections has been developed wherein the widest cross-sectional dimensions of the mold cups extend parallel to their direction of travel. Also, in such recently developed apparatus, the spacing between the mold cups is such that the sticks extending therefrom are substantially closer to each other than in the prior art devices. Such recently developed confection producing apparatus is disclosed in U.S. Pat. Nos. 4,324,108 and 4,330,245, to R. J. Billett and which are assigned to the assignee of the present application. Due to the different orientations and spacings of the mold cups in the mold members of such new confection apparatus, the extractor-conveyor of the present invention has been developed.

SUMMARY OF THE INVENTION

According to the present invention, an extractor-conveyor adapted to remove frozen stick confections from a confection freezing apparatus includes a plurality of extractor bar assemblies and an endless conveyor for moving the extractor bar assemblies from above the confection freezing apparatus to an ejection station above a wrapping apparatus. Each extractor bar assembly includes a plurality of gripper units that are initially arranged at intervals and orientations along the length of the extractor bar assembly to permit the gripper units to grasp the sticks of a row of frozen confections within the mold cups of the freezing apparatus. The stick gripper units are arranged on each extractor bar to be rotated through a selected angle and, in the preferred embodiment, to also be separated from each other to greater intervals therebetween. After each extractor bar has been lifted to pull a row of confections from the mold cups, the gripper units are thus caused to rotate and separate as the extractor bar assembly is conveyed toward the ejection station.

BRIEF DESCRIPTION OF THE DRAWINGS

FIG. 1 is a diagrammatic side elevation of a system for producing frozen confections that includes the extractor-conveyor of the present invention.

FIG. 2 is a diagrammatic top plan of the system for producing frozen confections that is partially broken away.

FIG. 3 is an enlarged section through the extractor-conveyor of the present invention taken along line 3—3 of FIG. 2, with a portion thereof being broken away and removed.

FIG. 4 is an enlarged fragmentary section of one of the gripper units of the extractor-conveyor at the ejection station.

FIG. 5 is a horizontal section taken along line 5—5 of FIG. 3.

FIG. 6 is an enlarged transverse section taken along line 6—6 of FIG. 3.

FIG. 7 is a diagrammatic view that illustrates the indexing drive arrangement of the extractor-conveyor.

FIG. 8 is an enlarged section through an extractor bar assembly of the extractor-conveyor that illustrates the construction of one of the gripper units.

FIG. 9 is an enlarged fragmentary section though an extractor bar assembly further illustrating the gripper units and their slidable and rotatable mounting within the channel of an extractor bar assembly.

FIGS. 10 and 11 are respectively diagrammatic top plan and front elevational views that illustrate the initial orientations and positions of the gripper units of an extractor bar assembly.

FIGS. 12 and 13 are respectively diagrammatic top plan and front elevational views that depict the final orientations and positions of the gripper units of an extractor bar assembly.

DESCRIPTION OF THE PREFERRED EMBODIMENT

FIGS. 1 and 2 illustrate a system 10 for producing frozen confections C that incorporates the extractor-conveyor 18 of the present invention. The system 10 is adapted to produce frozen confections C (FIG. 13) of the type that includes a block or bar of frozen confection material having a stick S projecting therefrom. The system 10 generally comprises a freezing apparatus 11 that includes a plurality of elongate closely spaced mold strips 12 and a conveyor including conveyor screws 13 (FIGS. 2 and 3) for indexing the mold strips through a rectangular path of travel (FIG. 2). The rectangular path of travel includes parallel filling and extraction lanes L1 and L2, respectively, and short lateral transfer legs extending between the ends of the filling and extraction lanes. In the filling lane L1, confection material is deposited by a filler 14 into the mold cups or compartments 12a of the mold strips. The material is then partially frozen by directing jets of cold brine against the bottoms of the mold strips. After being partially frozen, an inserter 16 (FIG. 1) inserts the sticks S into the confection material. The present invention relates to the extractor-conveyor apparatus 18 for removing the frozen confections from the mold cups at the downstream end of the extraction lane L2 and for transferring the confections to a wrapper 20.

The freezing apparatus 11 is fully described in the aforementioned patents of R. J. Billett et al and the disclosures of such patents are incorporated herein by reference. It is pointed out that the freezing apparatus 11 is adapted to convey the mold strips 12 in an intermittent fashion which permits them to dwell at the extraction station EXS for a period of time sufficient to allow the sticks to be grasped by the extractor-conveyor and to be pulled upwardly to remove the frozen confections from the mold cups 12a. It is further noted that, as best seen in FIG. 5, the mold cups 12a are formed in the mold strips so that the widest cross sectional dimension of each cup is oriented in the direction of travel of the mold strip in the filling and extraction lanes L1 and L2. It is noted that although the mold cups are depicted as having a rectangular cross-sectional shape, other polygonal shapes are well-known in the art, and the present extractor-conveyor 18 is adapted to extract and convey frozen confections of shapes different than those shown in the present drawings.

The system 10 for producing frozen confections further includes a pre-extractor 21 that is positioned upstream of the extractor-conveyor 18. The pre-extractor 21 is the subject of U.S. Pat. No. 4,352,830 which is assigned to the assignee of the present invention and entitled Apparatus for Extracting Confections. The pre-extractor includes spray manifolds 22 (FIG. 3) for spraying the mold cups with hot water to heat the mold cups to the extent that the confections may be removed and further includes several gripper units adapted to individually engage the sticks S of the confections in a single row of mold cups 12a. As described in the aforementioned U.S. patent of Billett et al, No. 4,352,830, the gripper units of the pre-extractor are individually biased by separate springs so that the frozen confections are extracted from each of the mold cups as soon as possible without subjecting the confections to any more heat than is required to enable to confections to be extracted. After being partially lifted out of the mold cups by the pre-extractor, the frozen confections are immediately dropped back into the mold cups. Due to frost which forms on the exterior of the confections as soon as they have been pre-extracted and before they are dropped back into the molds, the confections ride higher in the mold cups after pre-extraction so that they do not readhere to the mold cups and are therefore readily removable by the extractor conveyor 18 of the present invention without further heating of the mold cups at the extraction station EXS.

Referring to FIGS. 3-6, the extractor-conveyor 18 will be seen to include a plurality of extractor bar assemblies 24 which are indexed forwardly by an endless chain conveyor 26. The chain conveyor 26 is generally similar to the chain conveyor of the extractor shown and described in the aformentioned U.S. Pat. No. 3,031,978 to M. B. Rasumsson, and thus the features thereof will only be generally described. Conveyor 26 includes a pair of spaced chains 28 that are entrained about a pair of drive sprockets 30 mounted on a shaft 32 which is horizontally mounted to an elevated frame 36. The chains 28 are further received on sprockets 34 mounted to frame 36 above the downstream end of the extraction lane L2 (FIG. 3) to cause the chains to move through a horizontal lower reach from the extraction station EXS to an ejection station EJS above the wrapper 20. The squared and projecting ends of the extractor bar assemblies 24 (FIG. 11) are guided through the lower reach by parallel guide tracks or channels 38 (FIG. 3), the upstream ends of which are adapted to receive each extractor bar assembly as they are indexed forwardly from the extraction station EXS. The guide tracks are broken away at a chocolate dip station CDS (FIG. 3) and at a dry coat station DCS and terminate just prior to the ejection station EJS.

At the extraction, chocolate dip, dry coat and ejection stations, the extractor bar assemblies 24 which are centered at such stations are simultaneously reciprocated by similar reciprocating means as illustrated in FIGS. 6 and 7. Each reciprocating means includes transversely opposed blocks 40 for receiving the opposite projecting ends of the extractor bar assembly 24 (FIG. 6). The blocks 40 project inwardly from opposed cylindrical tubes or sleeves 42 that are reciprocatably received on rods 44 that, in turn, are mounted vertically at the opposite sides of the frame 36. The drive arrangement for concurrently reciprocating the sleeves 42 at the various stations is shown in FIG. 7. It will be seen therein that the sleeve and vertical guide rods 42, 44 at the chocolate dip station CDS, dry coat station DCS and ejection station EJS are given prime notations. The overall drive arrangement includes a drive shaft 46 upon which a cam 48 is mounted. The conveyor screws 13 (FIGS. 3 and 6) of the freezing apparatus 11 are driven by a chain drive arrangement that includes a speed reducer (not shown) having a double-ended output shaft, and the drive shaft 46 of the extractor-conveyor is operatively connected to such speed reducer so that cam 48 rotates through a complete revolution with each revolution of the indexing screws 13. Cam 48 is adapted to pivot a lever 50 mounted at one side of the extractor-conveyor frame upon a pivot 52 and spring loaded (by means not shown) into engagement with the cam. The lever 50, in turn, is arranged to drive a series of links and bellcranks on both sides of the conveyor (FIGS. 5 and 7). At each side of the extractor-conveyor, the sleeves 42 at the extractor station EXS are connected to short links 54 which, in turn, are connected to bellcranks 56 mounted on a common transverse shaft. One of these bellcranks (FIG. 7) is, in turn, connected by a relatively long rod 58 to an arm 60 of a further bellcrank 62, and such arm 60 of the bellcrank 62 is also connected by a short link 64 to the upper end of lever 50. Accordingly, when the lever 50 is pivoted by the cam 48, the bellcrank 62 will be oscillated, and this motion is translated through rod 58 to oscillate the bellcranks 56 to thereby reciprocate the sleeves 42 and thus the extractor bar assembly 24 which is at the extractor station EXS.

As also shown in FIGS. 5 and 7, the opposing drive sleeves 42' at the chocolate dip station CDS are operated by bellcranks 66 that are also mounted on a common transverse shaft, and one of the bellcranks 66 is connected to a further arm 68 of the bellcrank 62 by a rod 70 (FIG. 7). The sleeves 42" at the dry coat station DCS are operatively connected to a further pair of crank arms 72 which are secured upon the ends of the shaft to which the bellcrank 62 is connected. Finally, the sleeves 42"' at the ejection station EJS are operatively connected to a further pair of bellcranks 74 with one of these bellcranks being connected to the arm 60 of bellcrank 62 by a rod 76. With this arrangement, the sleeves 42', 42" and 42"' at the several stations along the path of travel of the extractor-conveyor 18 will be simultaneously reciprocated along with the sleeves 42 at the extraction station.

The conveyor 26 of the extractor-conveyor 18 is intermittently driven by an indexer unit 77 (FIG. 7) that is operatively connected to the drive shaft 46. Such indexer unit includes a cam arrangement designed to advance conveyor 26 by a distance equal to the spacing between the extractor bar assemblies 24 between the reciprocating vertical movements of the extractor bar assemblies 24. The indexer drives a chain 78 that is entrained upon an idler 79, and a second chain 80 is connected between the idler and the drive shaft 32 of the conveyor. The indexer unit is adapted to index the chains 28 forwardly after the extractor bar assemblies at the various stations have been elevated to the height of the guide channels 38 so that the extractor bar assemblies can be transferred between the channels 38 and the grooves in the blocks 40.

The construction of the extractor bar assemblies 24 will now be described in connection with FIGS. 8-11. Each extractor bar assembly includes an elongate channel 84 having a slot 86 formed longitudinally along its lower wall 85 thereof. Several gripper units 88 corresponding in number to the number of confections to be extracted from the cups 12a in one row of cups are received in the channel 84. Accordingly, there are 12 such gripper units per extractor bar assembly in the embodiment of the invention shown herein. Each gripper unit includes a gripper head 90 to which an inverted U-shaped holder blade 92 is pivotally mounted (FIG. 9). The gripper head has a generally rectangular lower end (FIG. 8) having an opening 94 through which an elevated central portion of the holder blade extends. The upper end of each gripper head includes a disc-shaped portion 96 having a large diameter cylindrical upper end 96a, hereinafter referred to as the disc 96a, and a reduced diameter lower end 96b, hereinafter called the shank 96b. The discs of the gripper heads are slidably and rotatably received in the channel 84 with the shanks 96b thereof extending through the slot 86. It will be seen in FIG. 8 that opposed bearing channels 100 are received within the channel 84 to enable the gripper units to readily slide and rotate therein.

The holder blades 92 mounted to the lower ends of the gripper heads 90 function in essentially the same manner as the holder plates 124 of the gripper units in the prior art extractor bar assemblies disclosed in the aforementioned Rasmusson U.S. Pat. No. 3,031,978. Generally, each holder blade 92 has a knife edge 92a adapted to cooperate with flat vertical wall portion 90a of the gripper head 90 to grip a stick S. Each blade is pivotally mounted on a pin 102, and a pair of torsion springs 104 (FIG. 8) is received on the pin for biasing the blade to normally force the blade edge 92a in the direction of the wall 90a. Thus, at the extraction station EXS, the gripper units may be forced downwardly over the sticks S of confections in mold cups 12a with the sticks sliding against the blade edges 92a (FIGS. 6 and 9). Upon the subsequent elevation of the extractor bar assembly, such edges of the holder blades engage the sticks against the opposing walls of the gripper heads. As shown in FIGS. 3, 4 and 5, at the ejection station EJS, a stationary cam bar 106 is transversely mounted to frame 36 below the lower reach of the conveyor to engage the projecting outer ends 92b of the blades as the gripper units are lowered to pivot the blades away from the sticks to allow all of the confections to drop into the chutes or lanes of the wrapper apparatus 20.

An important aspect of the present invention is that the extractor bar assemblies 24 cooperate with a cam rail 130 mounted to the extractor-conveyor frame 36 (FIGS. 5 and 10-13) to cause the frozen confections held by the gripper units of an extractor bar assembly to each rotate 90° about the vertical axes of the gripper units 88 and also to spread or separate from each other to greater intervals (FIGS. 3, 5, 11 and 13) as the extractor bar assembly moves from the extraction station EXS to the chocolate dip station CDS. Referring to FIGS. 8-11, it will be seen that each extractor bar assembly includes several links 108 that are respectively pivotally connected between adjacent gripper units 88. A pair of pins 110 and 112 (FIG. 10) extend perpendicularly upwardly from the disc 96a of each gripper unit. Pins 110 and 112 are located equidistantly on opposite sides of the axis of the respective disc portion by a prescribed spacing as shall be hereinafter described. The gripper unit at one end of each extractor bar is pivotally connected to a link 114; the link 114 is pivotally connected between the pin 112 of the end gripper unit and a pin 116 which is connected to an anchor block 118 that is rigidly connected within the end of channel 84. A block 120 having a cam follower roller 122 depending therefrom is slidably received within the opposite end of each extractor bar channel, and such slide block is pivotally connected by a link 124 to the pin 110 of the adjacent end gripper unit.

As shown in FIGS. 5, 6, 10 and 11, the gripper units 88 are initially closely spaced in accordance with the distance between the cups 12a in the mold strip 12 of the freezing apparatus 11; furthermore, the gripper units are initially oriented transversely of the extractor bar assembly, also in accordance with the aforedescribed orientations of the mold cups 12a. To achieve such orientations and spacings, the pins 110 and 112 are positioned at equal distances apart from the axis of each disc 96a, and the links 108, 114 and 124 have widths in a plane that is normal to the pivot pins 110,112 so that adjacent edges of the links abut against each other to act as stops which prevent the gripper units from rotating further clockwise as seen in FIG. 10 so that the gripper heads extend transversely of the extractor bar channel 84. The links have equal lengths that are selected so that when the links are so abutting, the gripper units will be spaced by uniform intervals equal to the intervals between the sticks S at the extraction station EXS.

The extended and rotated positions of the gripper units 88 of an extractor bar assembly 24 are shown in FIGS. 3, 5, 12 and 13. The camming rail 130 that cooperates with the cam follower roller 122 to spread and rotate the gripper units is horizontally mounted to the frame 36 to diverge outwardly in the direction of travel of the extractor bar assemblies from a position just downstream of the extraction station EXS (FIG. 5). It will be recognized that the camming rail engages the roller 122 to pull the slide block 120 and end link 124 outwardly as the confection-laden extractor bar assembly is moved forwardly in the direction of travel shown at the arrow in FIG. 5. Since the gripper unit at the opposite end of the extractor bar assembly is pivotally anchored to the link 114 at the opposite end of the channel 84, the interlinked gripper units will be progressively rotated and separated, as also depicted in FIG. 5. By progressive rotation and separation, it is meant that the gripper unit that is connected to the link 124 connected to the cam follower roller 122 will, for the most part, be rotated through 90° before the link 108 connected thereto is pulled outwardly within the channel 84 to rotate and thereafter pull the adjacent gripper unit. Such progressive rotation and separation of the gripper units will continue until finally the gripper unit anchored to the link 114 is rotated 90° (and then separated from the end block 118).

As previously stated, the links 108, and also end links 114 and 124 are adapted to abut against each other in the closed positions of the gripper units 88 (FIGS. 10 and 11). The links are also adapted to abut against each other in the separated positions (FIGS. 12 and 13) to assure that the gripper units are spaced at wider intervals and oriented transversely of their direction of travel so the confections C grasped thereby will be properly received by the wrapper apparatus 20. It will be noted that due to selected spacing of the pins 110 and 112 at opposite sides of the axis of the disc 96 of each gripper unit and due to the selected widths of the links, the adjacent edges of the links come into abutment with each other in both the closed and the open positions of the gripper units. In a specific example, the gripper units are initially spaced to accommodate 1.75 inch intervals between the sticks S of the confections C in the mold cups 12a and are adapted to rotate the confections 90° so that they are parallel to the extractor assembly bar while separating the confections to 2.75 inch intervals between the centerlines of the confections.

In operation, the freezing apparatus 11 indexes a mold strip 12 forwardly so that a row of mold cups 12a having frozen confections therein is positioned at the extraction station EXS. As previously stated, the confections have been separated from the mold cups by the pre-extractor 21 prior to arriving at the extraction station. The mold strip is caused to dwell at the extraction station so that the extractor bar assembly 24 at the extraction station may be lowered to the extent that the gripper units 88 thereof engage the sticks S of the confections (as best seen in FIG. 6). Upon the upward movement of the extractor bar assembly, the holder blades 92 of the respective gripper units grasp the sticks so that all of the confections are simultaneously extracted from the row of mold cups at the extraction station. The extractor bar assembly is then elevated until it is in alignment with the guide channels 38 (FIG. 3).

Then, the indexer unit 77 drives the conveyor 26 forwardly by one pitch distance (i.e., the distance between extractor bar assemblies) to bring the cam follower roller 122 of the extractor bar assembly into engagement with straight upstream end of the cam rail 130 (FIG. 5). Thereafter, the extractor bar assembly is conveyed in stepwise fashion with the cam roller cooperating with the cam bar 130 to cause the gripper units thereof to be progressively turned through 90° and to be spread or separated to wider uniform intervals.

The extractor bar assembly 24 is then conveyed past the straight section at the downstream end of the cam rail 130 into a position at the chocolate dip station CDS moving from channels 38 to the grooves in the blocks 40. It will be recalled that the extractor bar assemblies at the extraction, chocolate dip, dry coat and ejection stations EXS, CDS, DCS, EJS, respectively, occur simultaneously through the common drive arrangement shown in FIG. 7. When the laden extractor bar assembly 24 arrives at the chocolate dip station, the confections are lowered in their rotated and separated positions into a chocolate dip tank 140 (in phantom outline in FIG. 3) and are thereafter raised until the extractor bar assembly may be again advanced through guide channels 38 toward the dry coat station DCS. At the dry coat station, the laden extractor bar assembly is again lowered to enable a dry coater device 142 (phanton outline in FIG. 3) to apply a dry coating such as ground nuts to the chocolate-coated confection. Thereafter, the extractor bar assembly is returned to the guide channels 38 and is advanced in step-wise fashion to the ejection station EJS. At the ejection station, the extractor bar assembly is lowered so that the blades 92 of the several gripper units are pivoted upwardly by the cam bar 106 (FIG. 4) to simultaneously release all of the confections into the lanes of the wrapper apparatus 20.

After the confections C have been dropped into the wrapper apparatus 20, the empty extractor bar assembly 24 is conveyed about the drive sprockets 30 against arcuate support rails 144. Thereafter, the empty extractor bars are conveyed in inverted positions (FIG. 6) across support rails 146 (FIG. 3). To return the gripper units to their initial closer spacings and orientations, a converging cam rail 148 is mounted above the support rails 146 to engage the rollers 122 (FIG. 6) of the extractor bar assemblies to force the gripper units to progressively rotate 90° and retract to their initial positions with the links 108 abutting each other as shown in FIG. 10. Thereafter, the extractor bar assemblies are carried around the sprockets 34 against arcuate rails 150 to the extraction station.

Although the best mode contemplated for carrying out the present invention has been herein shown and described, it will be apparent that modification and variation may be made without departing from what is regarded to be the subject matter of the invention.

What is claimed is:

1. An apparatus for simultaneously extracting several stick confections from a row of mold cups of an apparatus for producing the stick confections and for transferring the extracted confections to a receiving area, each confection including a body of confection material and a stick projecting upwardly therefrom and from the mold cup in which it is formed, said extracting and transferring apparatus comprising: a plurality of extractor bar assemblies, each extractor bar assembly including separate gripper units depending therefrom in a row extending longitudinally of the extractor bar assembly, each gripper unit including means for releasably engaging a stick of a confection, means for conveying the extractor bar assemblies from above the extraction area where the confections are to be extracted from mold cups in which they are formed to a receiving area, means at said extraction area for lowering an extractor bar assembly to cause the gripper units to engage the sticks of confections within the mold cups and for thereafter elevating the extractor bar assembly so that it may be conveyed by said conveying means, means at said receiving area for causing said gripper units to release the sticks, and means operatively engageable with said gripper units between said extraction area and said receiving area for rotating said gripper units each through a selected angle.

2. The apparatus for extracting and transferring stick confections according to claim 1 wherein said means for rotating said gripper units also operates to simultaneously increase the spacing between said gripper units.

3. The apparatus for extracting and transferring stick confections according to claim 2 wherein each extractor bar assembly includes a channel, and each gripper unit includes a disc portion that is slidably and rotatably received in said channel, flexible means interconnecting said gripper units, a cam follower member slidably received in said channel and attached to an end one of said gripper units, and a camming member mounted to engage the cam follower as the extractor bar assembly is conveyed forwardly, whereby the gripper units of an extractor bar assembly are progressively rotated and separated as said cam follower member is conveyed past said camming member.

4. The apparatus for extracting and transferring stick confections according to claim 3 wherein said flexible means includes a pair of pins extending from the disc portion of each gripper unit parallel to the axis of the disc portion, links pivotally engaged on said pins for connecting adjacent gripper units, said links having selected widths in a plane that is normal to said pins such that the opposing adjacent edges of the links abut each other when said gripper units are in their initial orientations which are adapted to the orientations of said confections in said mold cups and to further abut against each other when the gripper units have been respectively rotated through said selected angle.

5. The apparatus for extracting and transferring stick confections according to claim 3 wherein said conveying means includes endless conveyor chains for engaging the opposite ends of the extractor bar assemblies, said chains having a lower reach extending from said extraction area to said receiving area and an upper reach extending thereabove in the opposite direction, and a second camming member mounted to said conveyor means adjacent the upper reach to inwardly deflect said cam follower member to return the gripper units to their initial orientations.

6. An improved apparatus for extracting stick confections from an apparatus for producing stick confections and for transferring the stick confections to further processing apparatus generally including a plurality of extractor bar assemblies, a conveyor for moving the extractor bar assemblies from the extraction area where the stick confections are to be removed from said apparatus for producing stick confections to a receiving area where the stick confections are to be released to said further processing apparatus, each extractor bar assembly including a plurality of gripper units for releasably engaging the sticks of the confections to be extracted, means at said extraction area for lowering an extractor bar assembly to cause the gripper units to engage the sticks of the confections within said apparatus for producing the confections and for thereafter raising the extractor bar assembly to remove the confections from said producing apparatus, and means at said receiving area for engaging said gripper units to cause the confections to be released, wherein the improvement comprises: means mounting said gripper units to each extractor bar assembly for rotation and for movement longitudinally relative thereto, and means operatively engageable with said gripper units as the extractor bar assembly is conveyed toward said receiving area for rotating and separating said gripper units to the extent that the engaged confections are rotated through selected angles and are separated from each other by greater intervals.

7. An improved apparatus according to claim 6 wherein each extractor bar assembly includes a channel and each gripper unit includes a disc portion which is slidably and rotatably received in said channel.

8. An improved apparatus according to claim 6 including camming means mounted between said extraction area and said receiving area, flexible means interconnecting said gripper units in each extractor bar assembly, and cam follower means operatively engaged with said gripper units and adapted to be engaged by said camming means to rotate and separate said gripper units.

9. A stick confection molding machine comprising a mold conveyor having rows of molds that are generally rectangular in section with the molds in each row having their widest dimension substantially parallel to the path of mold conveyor travel, extractor conveyor means comprising means for extracting the confections row by row from their molds, means for spreading the extracted confections along their respective rows, means for rotating the spread confections through a net angle of about 90° and means for releasing the spread and rotated confections at a wrapping station.

10. A stick confection machine of the type comprising a mold conveyor having rows of molds that are generally rectangular in section and extractor conveyor means having a reach moving on a path that is above and forms a continuation of a path of the mold conveyor, the improvement wherein the molds in each row have their widest dimension substantially parallel to the path of mold conveyor travel, said extraction conveyor means comprises means for extracting the confections row by row from their molds, means for spreading the extracted confections along their respective rows, means for rotating the spread confections through a net angle of 90° and means for releasing the spread and rotated confections at a wrapping station.

11. Apparatus for producing molded confections having projecting sticks, said apparatus comprising a mold conveyor mounting rows of mold cups for forming rows of spaced confections, an extractor conveyor having rows of grippers for gripping the confection sticks at an extraction station and extracting the confections from their molds and means for releasing the confection sticks and depositing the confections at a confection receiving station, the improvement wherein the mold cups are oriented with their major dimensions substantially parallel to the path of mold conveyor travel, means for spreading and rotating the grippers for a row of suspended confections relative to the gripper positions at said extracting station and means for depositing the spread and rotated confections at said receiving station.

12. The apparatus of claim 11, wherein said rotating means rotates the grippers through a net angle of substantially 90°.

13. The apparatus of claim 11, wherein said gripper spreading and rotating means progressively and simultaneously spreads and rotates said grippers as the extraction conveyor moves between said extracting and receiving stations.

14. A confection forming machine comprising a mold conveyor having transversely extending rows of molds, a confection extraction station at a delivery end of said mold conveyor and having substantially the same width as that of the mold conveyor, an extracted confection receiving station spaced from said extraction station and having a width substantially greater than that of said extraction station, means for extracting rows of confections from molds at said extraction station, means for spreading the extracted confections in each row to the width of said receiving station and means for releasing the spread confections at said receiving station.

15. In a stick confection forming machine comprising a mold conveyor of the type having transversely extending rows of molds for delivering confections to an extraction station, an overhead extractor conveyor having transversely extending extractor bars and stick grippers on said extractor bars for transporting extracted confections from the extraction station to a wrapping station, comprising the improvement wherein said extractor bars and said wrapping station are substantially wider than said rows of molds and said extraction station, means for slidably mounting said stick grippers on said extractor bars, and means for spreading the grippers in each row along their associated extractor bars from a row width substantially equal to the width of said extraction station to a row width substantially equal to the width of said wrapping station.

16. The machine of claim 15 wherein said molds are rectangular in cross section and are disposed with their longer dimension parallel to the path of motion of said mold conveyor.

17. The machine of claim 16 comprising means for rotating said grippers on said extractor bars to a position wherein the confections have their longer dimension normal to the path of mold conveyor motion when the grippers are at said wrapping station.

* * * * *